Patented Aug. 7, 1945

2,380,995

UNITED STATES PATENT OFFICE 2,380,995

PREPARATION OF ORGANOSILICON HALIDES

Eugene G. Rochow, Schenectady, N. Y., assignor to General Electric Company, a corporation of New York No Drawing. Application September 26, 1941, Serial No. 412,459

17 Claims. (Cl. 260—607)

This invention relates to the preparation of organosilicon halides and more particularly to the production of hydrocarbon-substituted silicon halides.

The present invention is based on my discovery that organosilicon halides, more particularly hydrocarbon-substituted silicon halides, can be produced by effecting reaction between silicon and a hydrocarbon halide. The reaction may be carried out in the presence or absence of a metallic catalyst for the reaction. The silicon may be used as such or in the form of alloys or mixtures with metals, specifically metals that themselves are catalysts for the reaction between silicon and a hydrocarbon halide.

It was known prior to my invention that hydrocarbon halides could be caused to react with elements other than silicon. For example, the reaction of hydrocarbon halides with magnesium in certain solvents to yield the so-called "Grignard reagent" is well known. Another example is the reaction of zinc or the zinc-copper couple with alkyl halides to give alkyl zinc halides similar in chemical behavior to the Grignard reagent. Zinc dimethyl also has been prepared by heating metallic zinc with methyl bromide or iodide in liquid state in a sealed tube. All such reactions are liquid phase reactions.

The reaction of hydrogen chloride with silicon also was known. Thus, Combes [Compt. rend., 122, 531 (1896)] obtained a mixture of approximately 80% trichlorosilane (silicochloroform) and 20% silicon tetrachloride by passing hydrogen chloride through an iron tube filled with silicon heated to 300° to 440° C.

It also was known prior to my invention that various hydrocarbon-substituted silicon halides could be produced. The known methods of preparing such substituted silicon halides generally have involved the use of the well-known Grignard reagent. Such a method of preparing methyl silicon chloride is described, for example, in my copending application Serial No. 287,787, filed August 1, 1939, now Patent No. 2,258,218, issued October 7, 1941. The present invention provides an improved process for producing hydrocarbon-substituted silicon halides at lower unit cost than is possible by the use of the Grignard reagent.

Briefly described, my invention resides in the improved method of preparing organosilicon halides, more particularly hydrocarbon-substituted silicon halides, e. g., alkyl silicon chlorides, bromides, etc., aryl silicon chlorides, bromides, etc., which comprises effecting reaction between silicon and a hydrocarbon halide, e. g., an alkyl chloride, bromide, etc., an aryl chloride, bromide, etc. In a preferred embodiment of the invention, reaction is effected between the silicon and the hydrocarbon halide while the latter is in vapor state, and, more particularly, while the said components are intimately associated with a metallic catalyst (e. g., copper) for the reaction. For instance, the silicon may be in the form of an alloy thereof with copper or other metal that has a catalytic effect upon the reaction between silicon and a hydrocarbon halide.

One specific method feature of my invention is the new and improved method of preparing, for example, methyl silicon chlorides which comprises bringing methyl chloride, more particularly gaseous methyl chloride, into contact with a solid mass containing silicon, e. g., a mass of silicon intimately associated with copper, heating the said methyl chloride and silicon-containing mass at a temperature sufficiently high to effect reaction between the methyl chloride and the silicon of the said mass, and recovering the methyl silicon chlorides.

Another specific method feature of the invention is the method which comprises causing gaseous methyl chloride or other hydrocarbon halide in gaseous or vapor state to react with silicon intimately associated, as by alloying, with copper or other metallic catalyst for the reaction, said reaction being carried out within the temperature range of 200° to 500° C. or more, and recovering the hydrocarbon-substituted silicon halides. For example, the effluent gaseous reaction products may be cooled by suitable means to obtain a condensate comprising hydrocarbon-substituted silicon halides, specifically methyl silicon chlorides.

It was quite surprising and unexpected to find that an organosilicon halide, more particularly a hydrocarbon-substituted silicon halide, could be produced by effecting reaction between silicon and a hydrocarbon halide, especially in view of the fact that silicon is commonly considered to be a metalloid and shows little or no resemblance to zinc, sodium, magnesium and the other highly electropositive metals heretofore known to react with hydrocarbon halides.

In order that those skilled in the art better may understand how the present invention may be carried into effect, the following illustrative examples thereof are given. All percentages are by weight.

*Example 1*

A stream of gaseous methyl chloride w?: passed into a heated tube where it contacted silicon powdered to pass through a 325-mesh screen. A reaction temperature of the order of 300° C. was maintained within the tube. The products passing from the exit end of the reaction tube were condensed and the individual compounds subsequently separated by fractional distillation. A typical condensate contains the following compounds in approximately the stated precentages:

|  | Per cent |
|---|---|
| Methyl silicon trichloride | 52 |
| Dimethyl silicon dichloride | 14.5 |
| Silicochloroform | 5–10 |
| Methyl dichlorosilane | 2–3 |
| Silicon tetramethyl | Trace |
| Trimethyl silicon chloride | Trace |

Example 2

A reaction tube was charged with lumps of sintered silicon obtained by firing silicon of approximately 325-mesh fineness in a hydrogen atmosphere at 1300° C. Chlorobenzene vapor was passed through the tube. A reaction temperature of approximately 600° C. was maintained within the tube. The reaction products were condensed, yielding a condensate comprising phenyl silicon chlorides.

Example 3

A reaction vessel lined with copper and provided with internal copper rollers was charged with 500 cc. chlorobenzene and 200 grams of comminuted (minus 20 mesh) copper-silicon alloy containing approximately 50% each of silicon and copper. A reaction temperature of the order of 230° to 280° C. was maintained within the closed vessel for 48 to 72 hours. During the reaction period the vessel was rotated, so that the rollers performed a grinding action on the alloy. The reaction products comprised phenyl silicon trichloride, diphenyl silicon dichloride, diphenyl and a tarry material.

Example 4

Same as Example 3 with the exception that the reaction vessel was charged with bromobenzene. The vessel was heated over a period of 4 hours to a temperature gradually rising to 335°, then cooled. The reaction products comprised a mixture of phenyl silicon bromides.

Examples 3 and 4 illustrate the production of a hydrocarbon-substituted silicon halide by effecting reaction between silicon and a hydrocarbon halide while the latter is in liquid state.

Example 5

A stream of gaseous methyl chloride was passed into a heated tube where it contacted silicon in the form of an alloy of approximately 50% each of silicon and copper. A reaction temperature of the order of 360° C. was maintained within the tube. The products passing from the exit end of the reaction tube were condensed. The products may be condensed at temperatures of the order of, for example, 0° to 20° C., in which case any unreacted methyl chloride escapes; or, they may be condensed in a trap maintained at a temperature of, for instance, minus 80° C., in which case any unreacted methyl chloride condenses along with the reaction products. The condensate comprised a mixture of methyl silicon chlorides (methyl chlorosilanes). The individual components of the condensate can be isolated, if desired, by known methods, for instance by fractional distillation.

Example 6

Bromobenzene was allowed to drip into a vertical tube filled with lumps of commercial copper-silicon alloy formed of approximately 50% each of copper and silicon. The tube was heated to 400° C. in a combustion furnace and the bromobenzene therefore was in vapor state during the reaction with the silicon of the copper-silicon alloy. The products were condensed. The condensate was distilled to separate the unchanged bromobenzene from the phenyl silicon bromides produced by the reaction.

Example 7

A glass tube was packed with porous pills or pellets pressed from a mixture of copper and silicon powders. The pellets contained 80% silicon and 20% copper and had been fired in a hydrogen atmosphere at about 1050° C. for two hours. (These contact masses and their preparation are more fully described and claimed in the copending application of Winton I. Patnode, Serial No. 412,461, filed concurrently herewith and assigned to the same assignee as the present invention.) The tube was heated in a combustion furnace while a slow stream of methyl bromide was passed through it. At approximately 275° C. reaction occurred between the methyl bromide and the silicon. A yellow liquid was readily condensed from the unreacted methyl bromide. From this liquid, methyl tribromosilane (boiling point 133.5° C.) and dimethyl dibromosilane (boiling point 112.3° C.) were isolated by fractional distillation.

Example 8

Ethyl chloride was allowed to evaporate into a tube filled with porous pellets prepared from a mixture of 90% powdered silicon and 10% powdered copper as described under Example 7. The reaction temperature was maintained at 300° to 325° C. The reaction products condensed in the form of a yellow, fuming liquid which, upon fractional distillation, was found to contain approximately 27% ethyl silicon trichloride, 26% diethyl silicon dichloride and 37% silicon tetrachloride.

Example 9

A glass tube was packed with porous copper-silicon pellets such as are described under Example 7. The tube, inclined slightly downward, was heated to 280° to 300° C. while ethyl bromide was allowed to drip into it. The products from the tube were condensed, yielding a yellow liquid comprising ethyl silicon bromides.

Example 10

Methyl iodide was allowed to drip into a sloping reaction tube charged with porous pellets formed from a mixture of 90% silicon and 10% copper and fired in hydrogen as described under Example 7. The tube was heated within the temperature range of about 300° to 310° C. Fifty-seven (57) grams of methyl iodide were passed into the heated tube over a period of two hours. A dark red liquid issued from the condenser affixed to the reaction tube. This liquid was distilled at atmospheric pressure. Besides unreacted methyl iodide, there was obtained a high-boiling yellow liquid comprising methyl silicon iodides.

Example 11

Gaseous methyl fluoride was passed into a tube filled with porous pellets formed of 90% silicon and 10% copper and fired in hydrogen as described under Example 7. The reaction tube was heated at a temperature of the order of 370° C. The products passing from the exit end of the tube were condensed. The condensate comprised unreacted methyl fluoride and methyl silicon fluorides.

*Example 12*

Same as Example 5 with the exception that a reaction temperature of the order of 325° C. was maintained within the reaction tube.

*Example 13*

Same as Example 5 with the exception that the temperature of the reaction was of the order of 380° C. and the silicon was employed in the form of a mixture of 95% comminuted silicon and 5% comminuted copper.

It will be understood, of course, by those skilled in the art that my invention is not limited to the specific hydrocarbon halides named in the above illustrative examples and that any other hydrocarbon halide may be employed as a reactant with the silicon, the conditions of reaction generally being varied depending upon the particular starting hydrocarbon halide and the particular end-products desired to be obtained. In general, the vapor phase reactions are preferred because they can be carried out more economically, may be controlled more easily and may be directed toward the production of the desired organosilicon halides with a minimum of by-products.

Likewise, the invention is not limited to the specific temperatures or temperature ranges mentioned in the examples. However, the reaction temperature should not be so high as to cause an excessive deposition of carbon upon the unreacted silicon during the reaction. In general, the reaction temperature to be used will vary with, for example, the particular hydrocarbon halide employed, the particular catalyst (if any) used and the yields of the specific reaction products desired to be obtained from a particular starting hydrocarbon halide. For example, by varying the temperature of reaction within the temperature range of, say, 200° to 500° C., the proportions of the individual products obtained when methyl chloride is brought into contact with silicon can be varied and, also, the overall rate of reaction of the methyl chloride. At temperatures of the order of 200° C. the reaction proceeds much more slowly than at reaction temperatures around 250° to 400° C. At temperatures much above 400° C., in the case of methyl chloride for example, there is a vigorous exothermic reaction which generally results in an undesirable deposition of carbon in the reaction tube. Although methyl silicon chlorides in varying yields can be produced by effecting reaction between methyl chloride and silicon at various temperatures within the temperature range of 200° to 500° C., optimum results usually are obtained within the more limited range of 250° to 400° C.

It also will be understood by those skilled in the art that metallic catalysts other than copper may be employed to accelerate or to control the course of the reaction between the hydrocarbon halide and the silicon. Examples of such catalysts, in addition to copper, are nickel, tin, antimony, manganese, silver and titanium.

The present invention provides a new and improved method for the production of alkyl silicon halides (e. g., methyl, ethyl, propyl, butyl, amyl, isoamyl, hexyl, etc., silicon halides), the aryl silicon halides (e. g., phenyl silicon halides, etc.), the aryl-substituted aliphatic silicon halides (e. g., phenylethyl silicon halides, etc.) and the aliphatic-substituted aryl silicon halides (e. g., tolyl silicon halides, etc.).

The products of this invention have utility as intermediates in the preparation of other products. For instance, they may be employed as starting materials for the manufacture of silicone resins. They also may be used as agents for treating water-non-repellent bodies to make them water-repellent as disclosed and claimed in the copending application of Winton I. Patnode, Serial No. 365,983, filed November 16, 1940, and assigned to the same assignee as the present invention. They also may be employed for treating glass fibers in continuous filament or other form.

In copending application Serial No. 412,460 of Eugene G. Rochow and Winton I. Patnode, filed concurrently herewith and assigned to the same assignee as the present invention, claims are made to a method of preparing hydrocarbon-substituted silicon halides wherein is utilized a solid, porous contact mass of the kind briefly described under, for instance, my above Example 7. As pointed out under that example, these contact masses and their preparation are more fully described and claimed in copending Patnode application Serial No. 412,461, filed concurrently herewith.

What I claim as new and desire to secure by Letters Patent of the United States is:

1. The method of preparing organosilicon halides which comprises effecting reaction between silicon and a hydrocarbon halide.

2. The method of preparing organosilicon halides which comprises effecting reaction between silicon and a hydrocarbon halide in a vapor state.

3. The method of preparing alkyl silicon chlorides which comprises effecting reaction between silicon and an alkyl chloride.

4. The method of preparing aryl silicon chlorides which comprises effecting reaction between silicon and an aryl chloride.

5. The method of preparing phenyl silicon chlorides which comprises effecting reaction between silicon and chlorobenzene.

6. The method of preparing hydrocarbon-substituted silicon halides which comprises effecting reaction between silicon and the vapors of a hydrocarbon halide while the said components are intimately associated with a metallic catalyst for the reaction.

7. The method of preparing hydrocarbon-substituted silicon halides which comprises effecting reaction between silicon and the vapors of a hydrocarbon halide while the said components are intimately associated with copper.

8. The method of preparing hydrocarbon-substituted silicon halides which comprises effecting reaction between the vapors of a hydrocarbon halide and silicon in the form of an alloy thereof with a metal that is a catalyst for the reaction.

9. The method of preparing hydrocarbon-substituted silicon halides which comprises effecting reaction between the vapors of a hydrocarbon halide and silicon in the form of an alloy thereof with copper.

10. The method of preparing methyl silicon chlorides which comprises effecting reaction between silicon and methyl chloride.

11. The method of preparing methyl silicon chlorides which comprises effecting reaction between silicon and methyl chloride while the said components are intimately associated with a metallic catalyst for the reaction.

12. The method of preparing methyl silicon chlorides which comprises effecting reaction between silicon and gaseous methyl chloride while the said components are intimately associated with copper.

13. The method of preparing methyl silicon chlorides which comprises effecting reaction between gaseous methyl chloride and silicon in the form of an alloy thereof with a metal that is a catalyst for the reaction.

14. The method of preparing methyl silicon chlorides which comprises effecting reaction between gaseous methyl chloride and silicon in the form of an alloy thereof with copper.

15. The method of preparing methyl silicon chlorides which comprises bringing gaseous methyl chloride into contact with a mass of silicon intimately associated with copper, heating the said methyl chloride and silicon-copper mass at a temperature sufficiently high to effect reaction between the methyl chloride and the silicon of the said mass, and recovering the methyl silicon chlorides.

16. The method which comprises causing gaseous methyl chloride to react with silicon intimately associated with copper, said reaction being carried out within the temperature range of 200° to 500° C., and cooling the effluent gases to obtain a condensate comprising methyl silicon chlorides.

17. The method of preparing phenyl silicon chlorides which comprises effecting reaction between silicon and chlorobenzene while the said reactants are intimately associated with silver.

EUGENE G. ROCHOW.